United States Patent
Cioffi

Patent Number: 5,887,032
Date of Patent: Mar. 23, 1999

[54] METHOD AND APPARATUS FOR CROSSTALK CANCELLATION

[75] Inventor: John M. Cioffi, Cupertino, Calif.

[73] Assignee: Amati Communications Corp., San Jose, Calif.

[21] Appl. No.: 707,322

[22] Filed: Sep. 3, 1996

[51] Int. Cl.$^6$ .............. H04B 3/32; H04L 25/08; H03K 5/01

[52] U.S. Cl. .......... 375/257; 375/346; 375/350; 370/201; 379/417; 455/295

[58] Field of Search .................. 375/346, 349, 375/286, 285, 257, 219, 350; 370/201, 280, 286, 282, 276, 290, 291; 379/417, 410, 406, 411; 455/295, 296

[56] References Cited

U.S. PATENT DOCUMENTS

| | | | |
|---|---|---|---|
| 4,117,277 | 9/1978 | Van Den Elzen et al. | 375/290 |
| 4,237,463 | 12/1980 | Bjor et al. | 370/27 |
| 4,438,530 | 3/1984 | Steinberger | 455/278 |
| 4,688,245 | 8/1987 | Schenk | 379/410 |
| 4,995,104 | 2/1991 | Gitlin | 370/6 |
| 5,181,198 | 1/1993 | Lechleider | 370/32.1 |
| 5,271,037 | 12/1993 | Szechenyi | 375/349 |
| 5,343,496 | 8/1994 | Honig et al. | 375/1 |
| 5,483,551 | 1/1996 | Huang et al. | 375/219 |

FOREIGN PATENT DOCUMENTS

| | | |
|---|---|---|
| 0 480 322 A2 | 4/1992 | European Pat. Off. |
| 0 498 369 A2 | 8/1992 | European Pat. Off. |
| WO 97/06619 | 2/1997 | WIPO |

OTHER PUBLICATIONS

Ho, et al., "Discrete Multitone Echo Cancelation", IEEE Transactions on Communications, vol. 44. No. 7, Jul. 1996.

Honig, Michael L., et al.; Suppression of Near–and Far–End Crosstalk by Linear Pre–and Post–Filtering; IEEE Journal on Selected Areas in Communications, vol. 10, No. 3, Apr. 1992.

Primary Examiner—Stephen Chin
Assistant Examiner—Betsy L. Deppe
Attorney, Agent, or Firm—Beyer & Weaver, LLP

[57] ABSTRACT

An apparatus or system for data communications that provides crosstalk cancellation is disclosed. The apparatus or system removes crosstalk interference (e.g., NEXT interference) from received signals on a given line by adaptively estimating the crosstalk interference induced by certain other of the lines having interfering transmissions and by canceling the crosstalk interference using the estimated crosstalk interference from the certain other of the lines. The invention is useful for high speed data transmissions where crosstalk interference can be a substantial impediment to proper reception of data. In particular, the invention is useful for VDSL and ADSL data transmissions using multicarrier modulation (e.g., DMT), wherein transmission frames for all lines are synchronized but the duration of the direction of transmission can vary due to differing frames.

19 Claims, 8 Drawing Sheets

METHOD AND APPARATUS FOR CROSSTALK CANCELLATION

CROSS-REFERENCE TO RELATED APPLICATION

This application is related to U.S. application Ser. No. 60/016,252 entitled MITIGATING RADIO FREQUENCY INTERFERENCE IN MULTI-CARRIER TRANSMISSION SYSTEMS; U.S. application Ser. No. 60/016,251 entitled RADIO FREQUENCY NOISE CANCELLER; and U.S. application Ser. No. 08/501,250 entitled TIME DIVISION DUPLEXED HIGH SPEED DATA TRANSMISSION SYSTEM AND METHOD, and each of these three related applications are hereby incorporated by reference.

BACKGROUND OF THE INVENTION

1. Field of the Invention

The present invention relates to a data transmission system and, more particularly, to a data transmission system that mitigates crosstalk interference.

2. Description of the Related Art

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). See "Asymretric Digital Subscriber Line (ADSL) Metallic Interface Specification," ANSI Standard T1.413-1995, ATIS Committee T1E1.4. Transmission rates under the ADSL standard are intended to facilitate the transmission of information at rates of up to 8 million bits per second over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least 25.96 Mbit/s and preferably at least 51.92 Mbit/s in the downstream direction. To achieve these rates, the transmission distance over twisted pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted-pair (UTP) telephone lines.

A number of modulation schemes have been proposed for use in the VDSL and FTTC standards (hereinafter VDSL/FTTC). Most of the proposed VDSL/FTTC modulation schemes utilize frequency division duplexing of the upstream and downstream signals. Another promising proposed VDSL/FTTC modulation scheme uses periodic synchronized upstream and downstream communication periods are provided that do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a "ping pong" based data transmission scheme. Quiet periods, during which no data is transmitted in either direction, separate the upstream and downstream communication periods. For example, with a 20-symbol superframe, two of the DMT symbols in the superframe are silent (i.e., quite period) for the purpose of facilitating the reversal of transmission direction on the phone line. In such a case, reversals in transmission direction will occur at a rate of about 4000 per second. For example, quiet periods of about 10–25 $\mu$s have been proposed. The synchronized approach can be used a wide variety of modulation schemes, including multi-carrier transmission schemes such as Discrete Multi tone modulation (DMT), as well as single carrier transmission schemes such as Quadrature Amplitude Modulation (QAM) and Carrierless Amplitude and Phase modulation (CAP). When the synchronized time division duplexed approach is used with DMT it is referred to as synchronized DMT (SDMT).

A common feature of the above-mentioned transmission systems is that twisted-pair phone lines are used as at least a part of the transmission medium that connects a central office (e.g., telephone company) to users (e.g., residence or business). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is known as crosstalk interference or near-end crosstalk (NEXT) interference. As the frequency of transmission increases, the crosstalk interference becomes substantial. As a result, the data signals being transmitted over the twisted-pair phone lines at high speeds can be significantly degraded by the crosstalk interference caused by other twisted-pair phone lines in the binder. As the speed of the data transmission increases, the problem worsens.

Conventional crosstalk cancellers have been used to attempt to reduce crosstalk. The difficulty with such conventional crosstalk cancellers is that they are very complex and difficult to implement. Therefore, the conventional crosstalk cancellers that have been previously proposed or implemented are cumbersome, ineffective and/or consume great amounts of resources. For example, the approach described in M. L. Honig et al., "Suppression of Near- and Far-end Crosstalk by Linear Pre- and Post-filtering," IEE Journal on Selected Areas in Communication, Vol. 10, No. 3, pp. 614–629, April 1992, requires so much processing to implement the filtering that its benefits are overshadowed by the processing burdens.

Hence, the problem with using twisted-pair phone lines with high frequency data transmission rates, such as available with ADSL and VDSL, is that the crosstalk interference (NEXT interference) from other lines in a binder becomes a substantial impediment to proper reception of the transmitted data signals. Also, conventional NEXT cancellers are too complex and costly to implement. Thus, there is a need to provide improved techniques to mitigate crosstalk interference.

SUMMARY OF THE INVENTION

Broadly speaking, the invention is technique for removing crosstalk interference (e.g., NEXT interference) from received signals on a given line by adaptively estimating the crosstalk interference induced by certain other of the lines having interfering transmissions and by canceling the crosstalk interference using the estimated crosstalk interference from the certain other of the lines. The invention is useful for high speed data transmissions where crosstalk interference can be a substantial impediment to proper reception of data. In particular, the invention is useful for VDSL and ADSL data transmissions using multicarrier modulation (e.g., DMT), wherein transmission frames for all lines are synchronized but the duration of the direction of transmission can vary due to differing frames.

The invention can be implemented in numerous ways, including as an apparatus, a system or a method. Several embodiments of the invention are described below.

As a crosstalk interference canceller for mitigating crosstalk interference induced by signals on a first line onto signals on a second line, an embodiment of the invention includes: an adaptive filter for producing a crosstalk cancellation signal based on estimated coupling coefficients between the first line and the second line at predetermined frequencies and based on signals on the first line at the predetermined frequencies; and a subtractor for subtracting the crosstalk cancellation signal from the signals on the second line to produce a modified signal on the second line, the modified signal thereby having any crosstalk interference from the first line mitigated. Preferably, the first line and the second line are twisted-pair wires, and the crosstalk interference canceller forms part of a synchronized DMT system where the predetermined frequencies are tone frequencies used by the synchronized DMT system.

As a crosstalk interference canceller for mitigating crosstalk interference induced by signals on a first line onto signals on a second line, another embodiment of the invention includes: an estimator to estimate crosstalk coupling coefficients for the first line with respect to the second line at predetermined frequencies; a comparator to compare the estimated crosstalk coefficients with a predetermined threshold; and a processor to process a signal being received on the second line to mitigate the crosstalk interference induced on the signal from the first line based on the estimated crosstalk coefficients determined to be greater than the predetermined threshold.

As a synchronized DMT system operating over a number of lines at a transmission site using time division multiplexed data transmission in which the direction of data transmission for all channels switches direction periodically, and in which between each direction change there is a quiet period in which no data is transmitted in either direction, an embodiment of the synchronized DMF system has a crosstalk interference canceller that includes: means for identifying respective pairs of lines that have overlap portions in which the direction data is concurrently transmitted is in opposite directions; means for determining crosstalk interference coefficients for the identified pairs of lines; means for comparing the crosstalk interference coefficients with a predetermined threshold; means for eliminating further operations for the identified pairs of lines in which the crosstalk interference coefficients do not exceed the predetermined threshold; and means for canceling crosstalk from the remaining identified pairs of lines using the crosstalk interference coefficients.

As a method for canceling near-end crosstalk (NEXT) interference induced on a received signal by a transmitting signal, an embodiment of the invention includes the operations of: transmitting a first signal on a first line while simultaneously receiving a second signal on a second line; estimating a crosstalk coefficient for the first line with respect to the second line; comparing the crosstalk coefficient with a predetermined threshold; and processing the second signal being received to mitigate the NEXT interference induced on the second signal from the first signal when the estimated crosstalk coefficient is determined to be greater than the predetermined threshold.

As a synchronized DMT system operating over a number of lines at a transmission site using time division multiplexed data transmission in which the direction of data transmission for all channels switches direction periodically, and in which between each direction change there is a quiet period in which no data is transmitted in either direction, an embodiment of synchronized DMT system incorporates a method for canceling near-end crosstalk (NEXT) interference that performs the operations of: transmitting a first signal on a first line while simultaneously receiving a second signal on a second line, the first and second signals include DMT symbols having a plurality of fixed frequency tones; producing an estimated crosstalk coefficient for each of the tones of the DMT symbols for the first line with respect to the second line; and processing each of the tones of the second signal being received to mitigate the NEXT interference induced on the second signal from the first signal based on the estimated crosstalk coefficients for the respective tones.

One advantage of the invention is that processing needed to implement the NEXT cancellers is substantially reduced. Another advantage of the invention is that the crosstalk cancellation processing is efficient because processing is avoided when it is not justified in view of its processing costs. The invention is particularly suited for high speed data transmission where crosstalk interference (NEXT interference) produced by transmitting lines within the same binder can significantly degrade the desired data signals being received.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Crosstalk interference refers to the undesirable coupling of a signal transmitted in one direction into a signal transmitted in the opposite direction. At a central office side of a data transmission system such crosstalk interference is known as near-end crosstalk (NEXT) interference. In one common scenario, NEXT interference occurs at a transmitter/receiver unit having multiple lines that have overlapping transmission and receive portions. The danger with NEXT interference is that signals received will be corrupted or swamped by electromagnetic interference from signals being transmitted at the same time. In particular, if signals are being received on a first line while other nearby lines are transmitting, the signals being received will be corrupted due to their relatively small signal strength compared to the signals being transmitted.

The invention pertains to a technique for removing crosstalk interference (e.g., NEXT interference) from received signals on a given line by adaptively estimating the crosstalk interference induced by certain other of the lines having interfering transmissions and by canceling the crosstalk interference using the estimated crosstalk interference from the certain other of the lines. The estimates for certain of the lines that cause the crosstalk interference can be updated while they are active. The invention can be implemented by providing the transmitter/receiver unit with crosstalk cancellers to cancel the crosstalk interference in the received signals. Such crosstalk cancellers can be implemented by circuitry and/or signal processing.

The invention is useful for high speed data transmission where crosstalk interference can be a substantial impediment to proper reception of data. In particular, the invention is useful for VDSL and ADSL data transmissions using multicarrier modulation (e.g., DMT), wherein transmission frames for all lines are synchronized but the duration of the direction of transmission can vary due to differing frames.

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
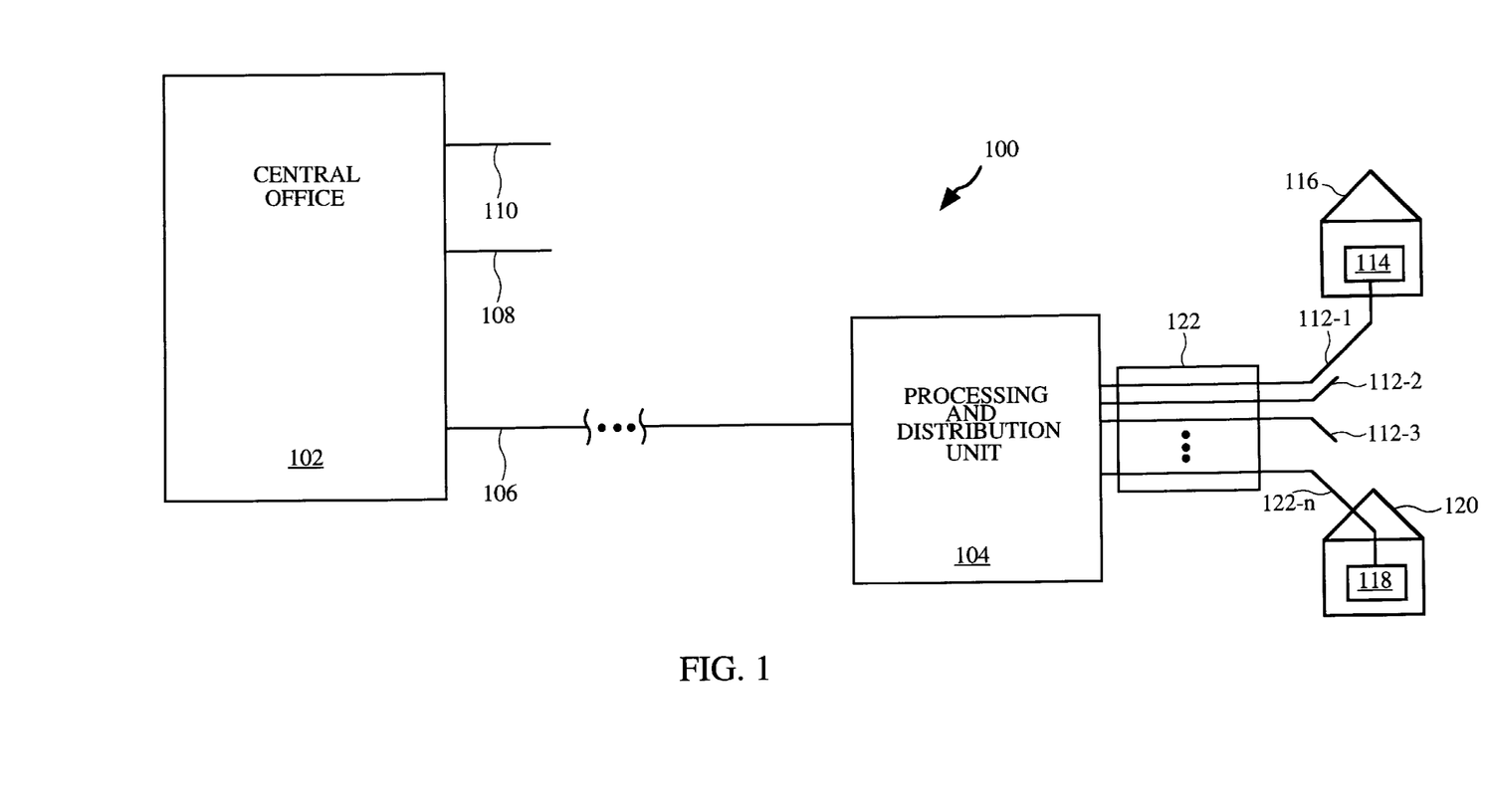
FIG. 1 is a block diagram of an exemplary telecommunications network suitable for implementing the invention.

FIG. 1 is a block diagram of an exemplary telecommunications network 100 suitable for implementing the invention. The telecommunications network 100 includes a central office 102. The central office 102 services a plurality of distribution posts to provide data transmission to and from the central office 102 to various remote units. In this exemplary embodiment, each of the distribution posts is a processing and distribution unit 104 (node). The processing and distribution unit 104 is coupled to the central office 102 by a high speed, multiplexed transmission line 106 that may take the form of a fiber optic line. Typically, when the transmission line 106 is a fiber optic line, the processing and distribution unit 104 is referred to as an optical network unit (ONU). The central office 102 also usually interacts with and couples to other processing and distribution units (not shown) through high speed, multiplexed transmission lines 108 and 110, but only the operation of the processing and distribution unit 104 is discussed below. In one embodiment, the processing and distribution unit 104 includes a modem (central modem).

The processing and distribution unit 104 services a multiplicity of discrete subscriber lines 112-1 through 112-n. Each subscriber line 112 typically services a single end user. The end user has a remote unit suitable for communicating with the processing and distribution unit 104 at very high data rates. More particularly, a remote unit 114 of a first end user 116 is coupled to the processing and distribution unit 104 by the subscriber line 112-1, and a remote unit 118 of a second end user 120 is coupled to the processing and distribution unit 104 by the subscriber line 112-n. The remote units 114 and 118 include a data communications system capable of transmitting data to and receiving data from the processing and distribution unit 104. In one embodiment, the data communication systems are modems. The remote units 114 and 118 can be incorporated within a variety of different devices, including for example, a telephone, a television, a monitor, a computer, a conferencing unit, etc. Although FIG. 1 illustrates only a single remote unit coupled to a respective subscriber line, it should be recognized that a plurality of remote units can be coupled to a single subscriber line.

The subscriber lines 112 serviced by the processing and distribution unit 104 are bundled in a shielded binder 122 as the subscriber lines 112 leave the processing and distribution unit 104. The shielding provided by the shielded binder 122 generally serves as a good insulator against the emission (egress) and reception (ingress) of electromagnetic interference. However, the last segment of these subscriber lines, commonly referred to as a "drop" branches off from the shielded binder 122 and is coupled directly or indirectly to the end user's remote units. The "drop" portion of the subscriber line between the respective remote unit and the shielded binder 122 is normally an unshielded, twisted-pair wire. In most applications the length of the drop is not more than about 30 meters.

The crosstalk interference (NEXT interference) primarily occurs in the shielded binder 122 where the subscriber lines 112 are tightly bundled. Hence, when data is transmitted on some of the subscriber lines 112 while other subscriber lines are receiving data, the crosstalk inference induced becomes a substantial impairment to proper reception of data. Hence, to overcome this problem, the processing and distribution unit 104 according to the invention activates crosstalk cancellers on the subscriber lines 112 as needed to mitigate the crosstalk interference. The telecommunications network 100 is, for example, suitable for a SDMT transmission system. One example of a SDMT transmission system is an SDMT VDSL system. The SDMT VDSL system is known to be a looped timed system because each subscriber line (loop) is loop timed. In such case, the length of the subscriber lines 112 are preferably less than 2 kilometers.

In many cases, a SDMT transmission system will have all lines of a processing and distribution unit (node) synchronize their upstream and downstream transmissions ("ping pong" transmission scheme). The advantage of doing so is that the NEXT interference problem is avoided because all transmissions on lines associated with a common node are always in the same direction. However, when the SDMT transmission system has lines associated with a common node providing different levels of service to end users at remote locations, the NEXT interference problem returns because transmissions with respect to a common node can again overlap in their transmission direction. The invention provides a method and apparatus for canceling NEXT interference that is particularly well suited for the SDMT transmission system offering different levels of service.

In a SDMT transmission system, the symbols of the transmission frame for the upstream direction are generally aligned with the symbols of the transmission frame for the downstream direction. Moreover, due to the cyclic prefix of DMT, each of the transmitted and received signals appear periodic within the memory span of the crosstalk or the channel. See, e.g., Ruiz et al., "Discrete Multiple Tone Modulation with Coset Coding for the Spectrally Shaped Channel," IEEE Comsoc Trans, May 1992. Note that the length of the prefix necessary to make the channel look periodic is usually sufficient to also make the NEXT interference look periodic. As a result, in a SDMT transmission system, the signals that induce NEXT interference appear to be periodic and the resulting crosstalk on a "tone" in a DMT receiver can only have originated on the same tone in another transmitter. Consequently, the invention is able to greatly simply the processing needed to implement crosstalk cancellers. With the invention, only one complex coefficient per crosstalk canceller is needed to eliminate the crosstalk interference. For example, assuming that there are six dominant crosstalkers undesirably coupling to a line from a receiver, the amount of computation would be one complex multiplication (i.e., four multiply operations) for each of the 256 tones on each DMT symbol. This about 1,000 multiply operations per symbol for each of the crosstalkers. If it is also assumed that due to different levels of service, there are 5 symbols in which crosstalk can occur (see FIG. 2 below). This totals to about 5,000 multiply operations for each of the crosstalkers. With the frame rate of 2,000 Hz, the resulting computation is about 10 million multiplies per second or 10 Mps for each crosstalker. Then, the resulting amount of computation is 60 Mps for the six crosstalkers combined. The amount of computation is predicted to be reduced by a factor of twenty (20) as compared with conventional cancellation approaches (namely, Honig et al.).

Hence, referring to the SDMT transmission system shown in FIG. 1, data transmissions over all lines 112 in the shielded binder 122 associated with the processing and distribution unit 104 are synchronized with a master clock. As such, all active lines emanating from the processing and distribution unit 104 will often be transmitting in the same direction (i.e., downstream or upstream). As a result, NEXT interference is often times eliminated as a noise source. However, in some cases not all lines within the shielded binder 122 are using SDMT or even when using SDMT will include different levels of service. When different levels of service are used at a particular processing and distribution unit 104 (node), periods of transmission on some of the active lines will overlap with periods of reception on other active lines. Consequently, despite the use of SDMT, NEXT interference is undesirably present when different levels of service are used at a particular processing and distribution unit 104.

Depending on the level of service being provided, data transmission implemented with SDMT can be symmetric or asymmetric with respect to upstream and downstream transmissions. With symmetric transmission, DMT symbols are transmitted in alternating directions for equal durations. In other words, the duration in which DMT symbols are transmitted downstream is the same as the duration in which DMT symbols are transmitted upstream. With asymmetric transmission, DMr symbols tend to be transmitted downstream for a longer duration than upstream.

Figure 2:
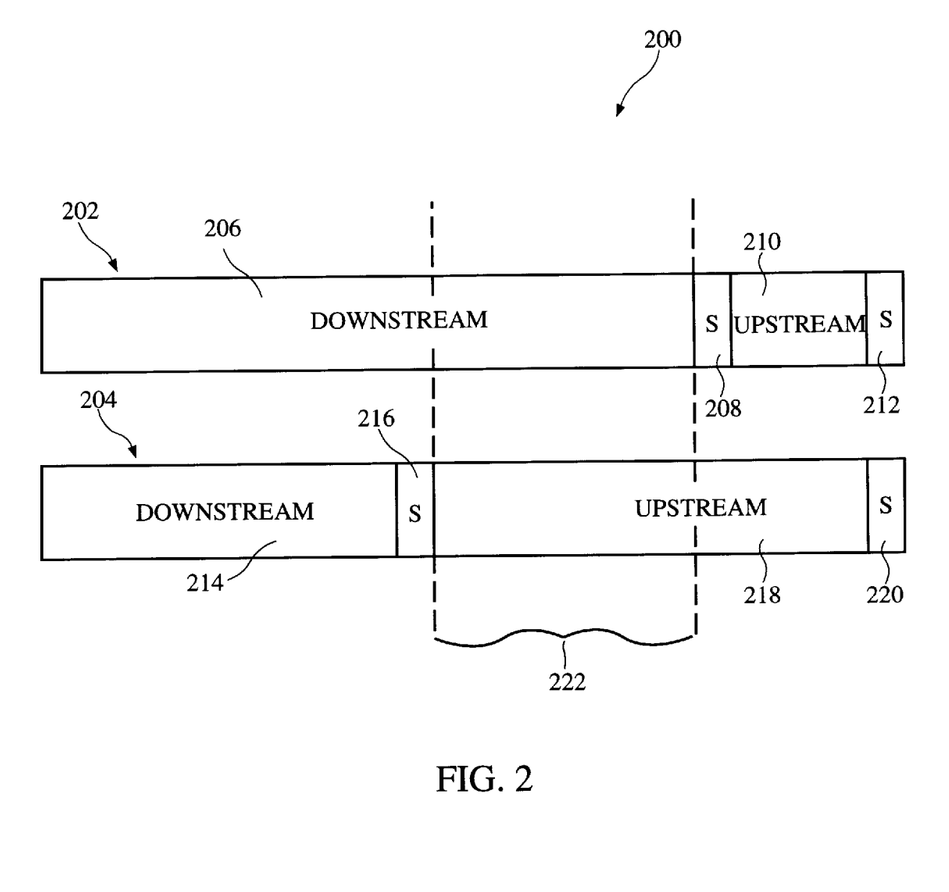
FIG. 2 is a diagram illustrating an exemplary arrangement in which two different levels of service are provided.

FIG. 2 is a diagram illustrating an exemplary arrangement 200 in which two different levels of service are provided. The pictorial arrangement 200 illustrates a situation in which overlapping downstream and upstream transmissions occur in a SDMT transmission system having first and second transmission frames 202 and 204 with different levels of service. The first transmission frame 202 is an asymmetric frame that includes a downstream portion 206, a silent portion 208, an upstream portion 210, and a silent portion 212. The silent portions (periods) 208 and 212 are positioned between the downstream and upstream transmissions. With this asymmetric transmission frame 202, the downstream portion 206 is substantially larger than the upstream portion 210. Such frame is useful for situations in which downstream traffic is significantly greater than the upstream traffic. The second transmission frame 204 is a symmetric transmission frame that includes a downstream portion 214, a silent portion 216, an upstream portion 218, and a silent portion 220. Again, the silent portions (periods) 216 and 220 are positioned between the downstream and upstream transmissions. In the downstream portion 214 and the upstream portion 218, an equal number of symbols are transmitted in the respective directions. An overlap region 222 is also indicated in FIG. 2. The overlap portion 222 is the portion in which the transmission frames 202 and 204 have overlapping transmissions of opposite directions. In particular, the transmission frame 202 is transmitting symbols in the downstream direction during the overlapped region and the transmission frame 204 is transmitting symbols in the upstream direction the during overlap portion 222.

As an example, with respect to FIG. 2, the first transmission frame 202 can include: 16 symbols downstream; 1 silent period; 2 symbols upstream; and 1 silent period. The second transmission frame 204 can include: 9 symbols downstream; 1 silent period; 9 symbols upstream; and 1 silent period. In this example, the transmission frame for the first transmission frame 202 is asymmetric and the second transmission frame 204 is symmetric. With this example, the last 6 symbols of asymmetric downstream of the first transmission frame 202 overlap the first 6 symbols of symmetric upstream of the second transmission frame 204, thus these symbols are at risk of having serious interference due to NEXT interference. Circularly shifting second transmission frame 204 one symbol to the right would leave 5 symbols subjected to NEXT interference, as used in the example above.

Figure 3:
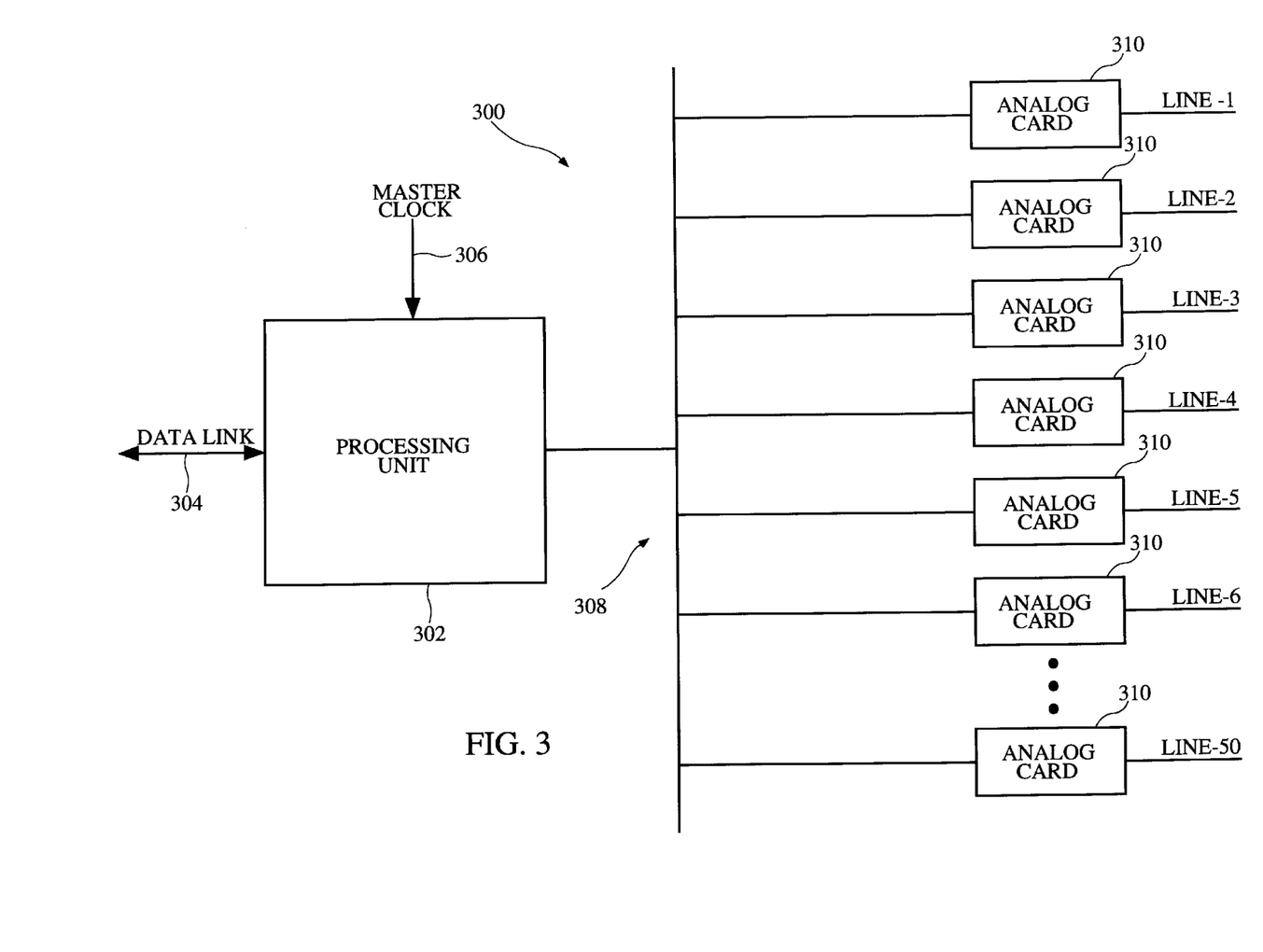
FIG. 3 is a block diagram of a processing and distribution unit according to an embodiment of the invention.

FIG. 3 is a block diagram of a processing and distribution unit 300 according to an embodiment of the invention. For example, the data processing and distribution unit 300 is a detailed implementation of the processing and distribution unit 104 illustrated in FIG. 1.

The data processing and distribution unit 300 includes a processing unit 302 that receives data and sends data over a data link 304. The data link 304 could, for example, be coupled to a fiber optic cable of a telephone network or a cable network. The processing unit 302 also receives a master clock 306 for providing synchronization to various processed transmissions and receptions of the processing unit 302. The data processing and distribution unit 300 further includes a bus arrangement 308 and a plurality of analog cards 310. The output of the processing unit 302 is coupled to the bus arrangement 308. The bus arrangement 308 together with the processing unit 302 thus direct output data from the processing unit 302 to the appropriate analog cards 310 as well as direct input from the analog cards 310 to the processing unit 302. The analog cards 310 provide analog circuitry utilized by the processing and distribution unit 300 that is typically more efficiently perform with analog components than using digital processing by the processing unit 302. For example, the analog circuitry can include filters, transformers, analog-to-digital converters or digital-to-analog converters. Each of the analog cards 310 are coupled to a different line. Typically, all the lines for a given data transmission system 300 are bundled into a binder including about fifty (50) lines (LINE-1 through LINE-50). Hence, in such an embodiment, there are fifty (50) analog cards 310 respectively coupled to the fifty (50) lines. In one embodiment, the lines are twisted-pair wires. The processing unit 302 may be a general-purpose computing device such as a digital signal processor (DSP) or a dedicated special purpose device. The bus arrangement 308 may take many arrangements and forms. The analog cards 310 need not be designed for individual lines, but could instead be a single card or circuitry that supports multiple lines.

The crosstalk interference problem occurs on the lines proximate to the output of the processing and distribution unit 300. With respect to the block diagram illustrated in FIG. 3, the crosstalk is most prevalent near the outputs of the analog cards 310 because this is where the lines are closest to one another and have their largest power differential (between transmitted and received signals). In other words, from the output of the processing and distribution unit 300 the lines travel towards the remote units. Usually, most of the distance is within a shielded binder that would, for example, hold fifty (50) twisted-pair wires, and the remaining distance is over single unshielded twisted-pair wires. Because all these lines (e.g., twisted-pair wires) are held in close proximity in the binder and individually offer little shielding against electromagnetic coupling from other of the lines in the binder, crosstalk interference (namely NEXT interference) between the lines within the binder is problematic. The invention provides a unique approach to cancel or otherwise compensate for the undesired crosstalk.

Figure 4:
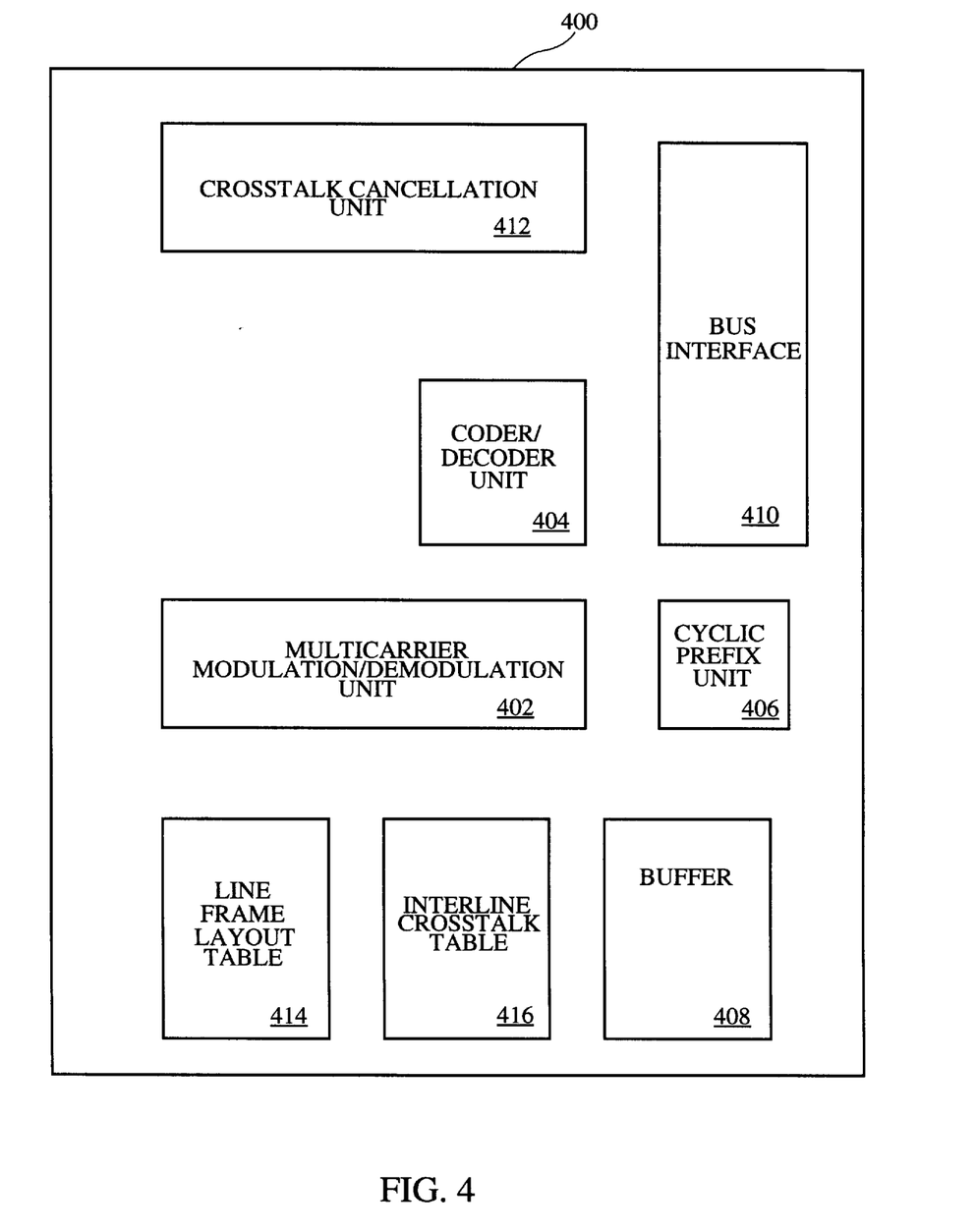
FIG. 4 is a block diagram illustrating an exemplary embodiment of a processing unit.

FIG. 4 is a block diagram illustrating an exemplary embodiment of a processing unit 400. The processing unit 400 can, for example, be used as the processing unit 302 of FIG. 3. The processing unit 400 illustrates the major functional blocks that are relevant to implementing the processing and distribution unit 104.

The processing unit 400 includes a multicarrier modulation/demodulation unit 402, a coder/decoder unit 404, a cyclic prefix unit 406, a buffer 408, a bus interface 410, a crosstalk cancellation unit 412, a line frame layout table 414, and an inter-line crosstalk table 416. In one embodiment, the functions performed by the processing unit 400 are implemented by one or more digital signal processors.

The following processing is performed when the processing unit 400 receives a data signal to be transmitted downstream from the central office 102 to a remote unit. First, the coder/decoder unit 404 encodes the data signal. Then, the multicarrier modulation/demodulation unit 402 transforms (i.e., modulates) the encoded data signal into the time domain. The modulation can be implemented by an Inverse Fast Fourier Transform (IFFT). A cyclic prefix is then added by the cyclic prefix unit 406 and the resulting signals are then stored to the buffer 408. The bus interface 410 then forwards the resulting signals from the buffer 408 to the appropriate one of the analog cards 310. At the analog card 310, the resulting signals are converted to analog signals by a digital-to-analog converter, filtered and then coupled to the corresponding subscriber line.

The following processing is performed when the processing unit 400 receives a data signal received from a remote unit transmitting in the upstream direction. The received data signal is received by an analog card 310 coupled to the corresponding subscriber line. At the analog card 310, the received data signal is filtered and then converted to digital signals by an analog-to-digital converter. The digital signals are then forwarded to the bus interface 410 of the processing unit 400. The bus interface 410 in turn forwards the digital signals to the buffer 408. As the digital signals are removed from the buffer 408, the cyclic prefix is removed by the cyclic prefix unit 406. The digital signals are then transformed (i.e., demodulated) into the frequency domain. The demodulation can be implemented by a Fast Fourier Transform (FFT). Next, the crosstalk cancellation unit 412 removes or mitigates the NEXT interference due to certain other subscriber lines within the shielded binder 122. The resulting signals are hen decoded by the coder/decoder unit 404 and then forwarded to the central unit 102. The line frame layout table 414 and the inter-line crosstalk table 416 are maintained by the processing unit 400 for use by the crosstalk cancellation unit 412. The line frame layout table 414 stores information on the transmission frames being utilized on each of the lines. Recall, FIG. 2 illustrates an example of two different transmission frames. Here, the line frame layout table would store information that specifies the duration and location of upstream, downstream and silent periods. The line frame layout table 414 may also store information on where the various transmission frames for the lines have overlapping transmission and reception portions (overlap portions). The inter-line crosstalk table 416 stores, for a given line, information on which of the other lines cause interference or crosstalk on the given line.

Figure 5A:
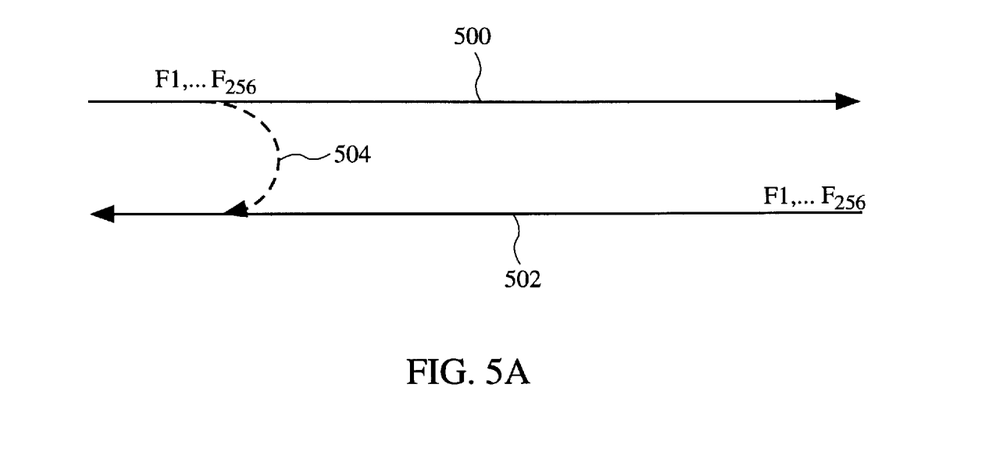
FIG. 5A is a conceptual diagram of two SDMT lines in a binder that have overlapping directions of transmission.

FIG. 5A is a conceptual diagram of two SDMT lines in a binder that have overlapping directions of transmission. As an example, the overlapping directions of transmission could correspond to the overlap portion 222 of the transmission frames 202 and 204 illustrated in FIG. 2. In any case, the conceptual diagram of FIG. 5A has one line 500 currently transmitting signals downstream and another line 502 receiving signals from downstream. The signals being transmitted on these lines 500 and 502 are DMT symbols that are transmitted with 256 tones. The transmission on the line 500 causes problematic NEXT interference 504 on the signals being received on the line 502. Although theoretically crosstalk interference is induced from the line 502 to the line 500 as well, such crosstalk is not problematic as signals being transmitted are normally significantly more powerful than received signals. Hence, crosstalk from lines transmitting to lines concurrently receiving are of primary importance and the focus of the remaining discussion.

Figure 5B:
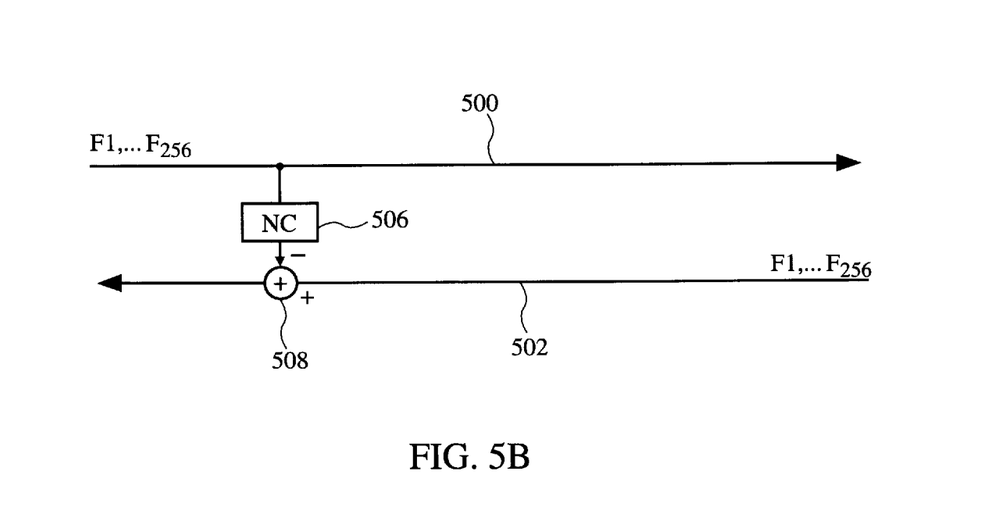
FIG. 5B is a conceptual diagram of a crosstalk cancellation in accordance with the invention.

FIG. 5B is a conceptual diagram of crosstalk cancellation in accordance with the invention. The two SDMT lines 500 and 502 are the same as in FIG. 5A. The NEXT interference 504 shown in FIG. 5A is eliminated or mitigated by a NEXT canceller 506 inserted between the lines. The NEXT canceller 506 is preferably implemented by processing performed by the processing unit 300, 400 (e.g., crosstalk cancellation unit 412) despite being illustrated as a hardware component. The crosstalk canceller 506 estimates the crosstalk induced from the transmitting line 500 to the receiving line 502.

Then an adder/subtractor 508 subtracts the estimated crosstalk from the received signals, thereby eliminating or mitigating the NEXT interference. The operations performed by the crosstalk canceller 506 are explained below in detail with reference to FIGS. 6 and 7.

Figure 6:
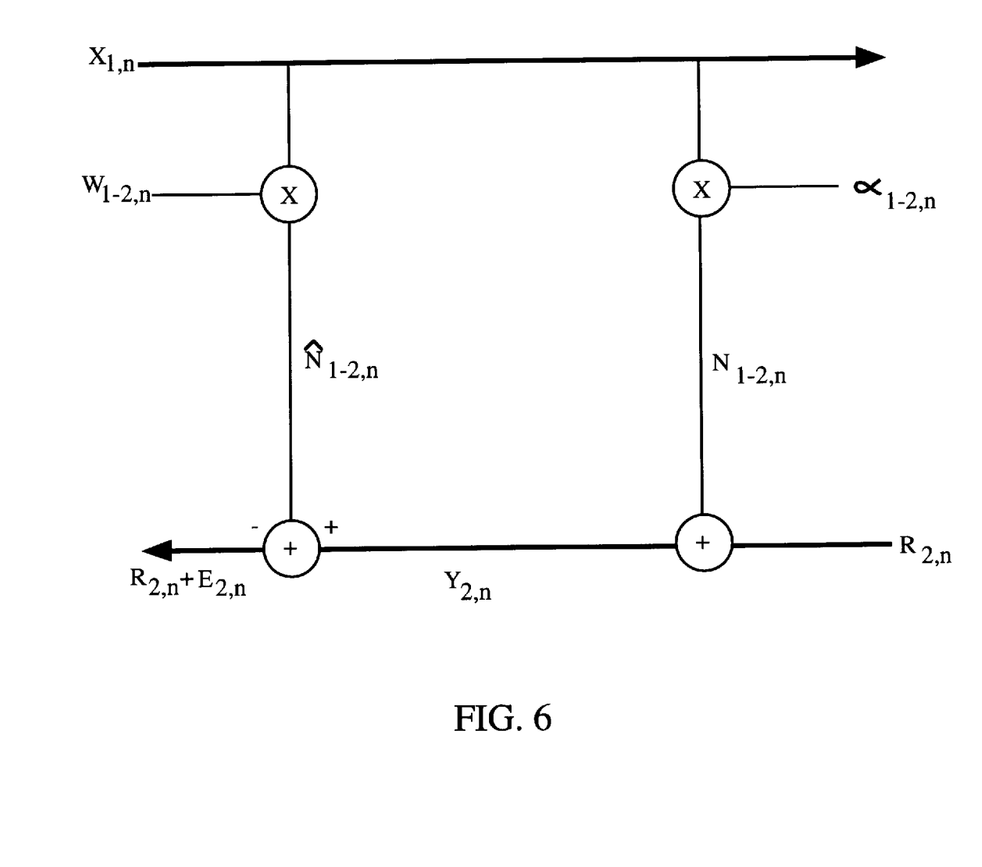
FIG. 6 is a conceptual diagram illustrating cancellation of crosstalk in accordance with the invention.

FIG. 6 is a conceptual diagram illustrating cancellation of crosstalk in accordance with the invention. A transmitting signal in a downstream direction on a first line is referenced as $X_{1, n}$, and a transmitting signal in an upstream direction on a second line is referenced as $R_{2, n}$. The value n indicates the one of the DMT tones to which the processing pertains. Due to crosstalk interference, a portion of the transmitting signal couples over into the received signal, thus corrupting the received signal. Here, the crosstalk interference is referenced as $N_{1-2, n}$, and the corrupted received signal is $Y_{2, n}$ is determined in accordance with equation (1) below.

$$Y_{2, n} = R_{2, n} + N_{1-2, n} \quad \ldots (1)$$

The crosstalk interference $N_{1-2, n}$ is modeled as $(\alpha_{1-2, n} \cdot X_{1, n})$ with $\alpha_{1-2, n}$ being a coupling coefficient from the first line to the second line.

The invention then operates on the corrupted received signal $Y_{2, n}$ to mitigate the corruption to the received signal due to the crosstalk interference using an adaptive approach. One suitable adaptive approach is a Least-Means-Square (LMS) adaptive approach. The coupling coefficient ($\alpha$) for each tone for each set of lines can be different and thus are individually determined. The adaptive approach estimates the coupling coefficient ($\alpha$) using an estimated coefficient (W), as the approach adapts the estimated coefficient converges to the coupling coefficient (a). The approach multiplies the estimated coefficient $W_{1-2, n}$ by $X_{1, n}$ to produce an estimated crosstalk interference $\hat{N}_{1-2, n}$. Then, the estimated crosstalk interference $\hat{N}_{1-2, n}$ is subtracted from the corrupted received signal $Y_{2, n}$ so as to produce a compensated received signal. The compensated received signal is referenced as $(R_{1-2, n} + E_{2, n})$ with $E_{2, n}$ being an error signal that remains since the cancellation of crosstalk interference is an adaptive process that seeks to make the error signal as small as possible. In any case, the compensated received signal closely approximates the ideal received signal $R_{2, n}$ and any undesirable effects of the crosstalk interference are substantially mitigated.

The invention is advantageous and substantially less complex to implement than conventional approaches. In particular, because the interfering crosstalk interference in SDMT can only be from the same tone in another transmitter, the estimated crosstalk interference $\hat{N}_{1-2, n}$ can be modeled by the product of $W_{1-2, n}$ by $X_{1, n}$, where $W_{1-2, n}$ is a complex number. Hence, for each tone of each interfering pair of lines, the estimated coefficient (W) is determined and then multiplied by the current transmitting signal. The resulting estimated crosstalk interference $\hat{N}_{1-2, n}$ can then be subtracted from the current received signal. This processing is substantially reduced as compared with conventional approaches. The Honig et al. approach, for example, requires a substantially larger computation of a sum of complex products for each estimated coefficient.

Figure 7:
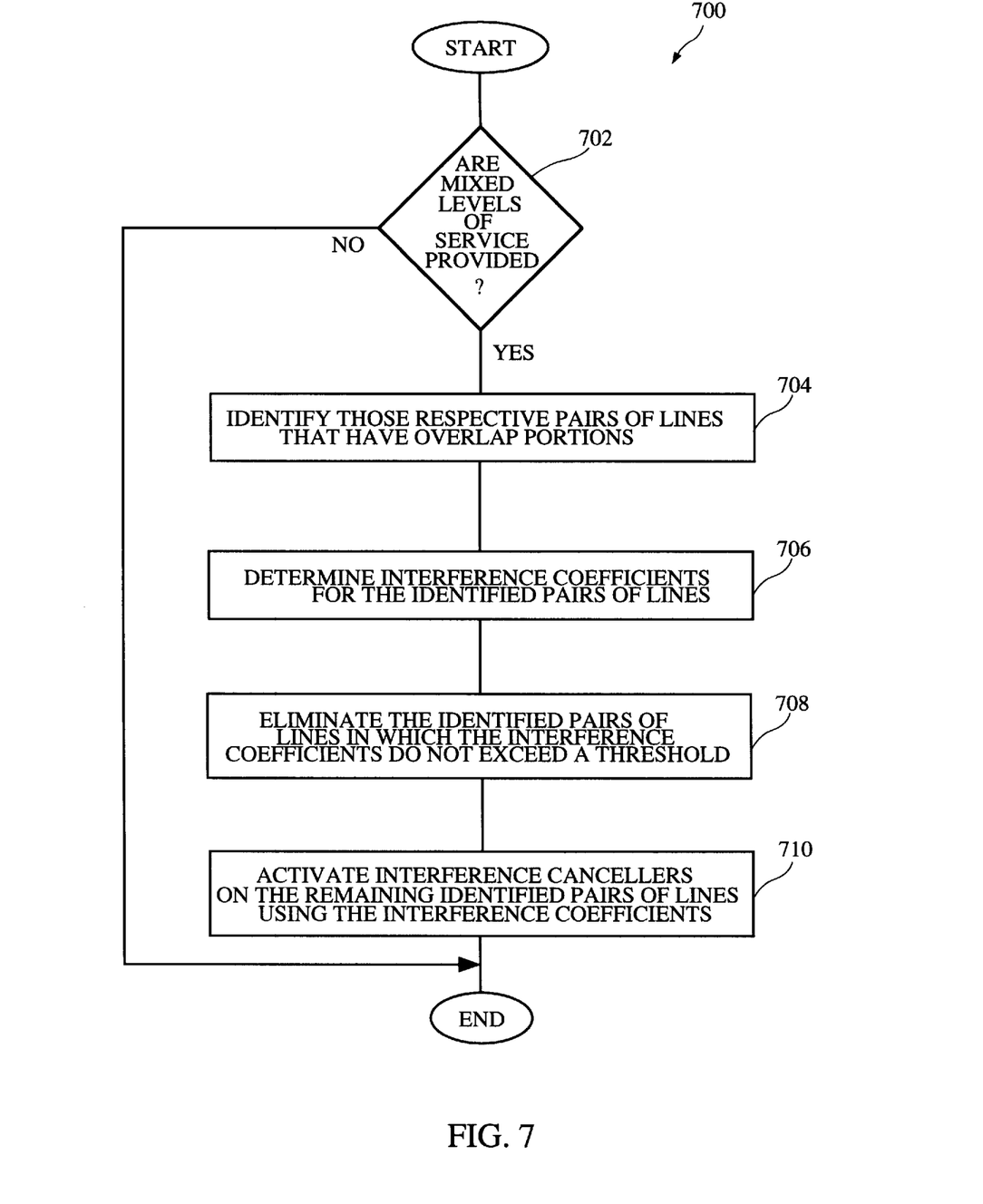
FIG. 7 is a flow diagram of crosstalk cancellation processing according to an embodiment of the invention.

FIG. 7 is a flow diagram of crosstalk cancellation processing 700 according to an embodiment of the invention. As an example, the crosstalk cancellation processing 700 can be performed by the processing unit 300.

The crosstalk cancellation processing 700 begins with a decision block 702 that determines whether mixed levels of service are being provided in a binder. The information in the line frame layout table 414 and the inter-line crosstalk table 416 can be helpful in making the determination. With SDMT, the transmission frames for lines within the binder could be different such that periods of transmission and reception overlap. For example, in FIG. 2 the overlap portion 222 occurs because mixed levels of service are provided, namely one line is using a symmetric transmission frame while another line is using an asymmetric line. When mixed service levels are not being provided within the binder (i.e., all lines have identical transmission frames), then the crosstalk cancellation processing 700 is complete and ends because crosstalk interference is not a concern in such a situation. This is a significant advantage of SDMT and results in a large savings in processing because it is anticipated that in many cases there will be only one level of service within a binder.

On the other hand, when mixed service levels are being provided in the binder, the crosstalk cancellation processing 700 continues. The respective pairs of lines that have overlap portions are identified 704. The processing unit 300 can determine the overlap portions for all the respective pairs of lines using the information stored in the line frame layout table 414. Interference coefficients (W) for the identified pairs of lines are then determined 706. The interference coefficients (W) are initially determined by an adaptive algorithm (e.g., a Least-Means-Square (LMS) adaptive approach). Next, the identified pairs of lines in which the interference coefficients do not exceed a threshold are eliminated 708. Here, if the interference coefficient is below some predetermined threshold, there is no need to perform the interference cancellation for that particular line as the crosstalk interference is small enough to avoid processing associated with its cancellation. It should also be noted that the information stored in the inter-line crosstalk table 416 can be used to prevent processing of interference coefficients (W) for identified pairs of lines that have been previously determined not to have a crosstalk problem. In this regard, not all line within a binder have crosstalk interference problems, namely only certain of the transmitting lines induce crosstalk interference on a given receiving line.

Following block 708, the interference cancellers on the remaining identified pairs of lines are activated 710. The interference cancellers make use of the corresponding interference coefficients (W) and perform and adapt in accordance with the cancellation technique explained with reference to FIG. 6. It should be noted that the interference cancellers that are activated 710 need only be operational during the periods in which transmission and reception overlap (overlap portions) for the associated pairs of lines.

From each node, a number of lines transmit or receive data. Hence, each of the lines needs to know which of the other lines are causing interference or crosstalk that distorts their desired signal. Such information is stored in the inter-line crosstalk table 416 illustrated in FIG. 4. Those lines that are identified as creating interference can then be canceled using the crosstalk cancellation according to the invention. The advantage of determining those lines that need to be monitored and processed is that wasted processing need not performed. The crosstalk cancellation processing 700 makes use of the inter-line crosstalk table 416 and the processing unit 300, 400 and operates to maintain the inter-line crosstalk table 416.

There are two approaches available to determine which lines are creating crosstalk interference on a given line. In the first approach, the silent periods which occur within the transmission frames of SDMT are utilized. By making use of the silent periods as well as identifying those particular lines that are not in use, the system can determine the crosstalk interference caused on a given line by certain of the other lines. If crosstalk interference is detected due to one of the other lines, a crosstalk canceller is activated for that line with respect to the given line. The amount of crosstalk interference induced by certain of the other lines can be periodically monitored and updated using the silent periods and the same technique. This approach of using the silent periods to monitor interference is described in greater detail in U.S. application Ser. No. 60/016,251 entitled RADIO FREQUENCY NOISE CANCELLER for the case radio interference, and which was incorporated by reference above.

A second approach is more sophisticated and uses its symmetry to determine the lines which create crosstalk interference on the given line. The general approach is to perform testing on each line prior to it being placed in service. Initially, if there is no mixture of service level being provided, and all the frames are symmetric SDMT, then the processing is complete and ends because there will be no overlap. On the other hand, if there is a mixture of levels being provided, then a dummy tone can be placed on a new line desiring service to determine whether its transmission will cause crosstalk on the other of the lines. The inter-line crosstalk information can be stored in the interline crosstalk table 416 shown in FIG. 4. Thereafter, if and when these other lines are placed in service, it has been previously determined, that these other lines will induce crosstalk interference on the respective given lines.

Figure 8:
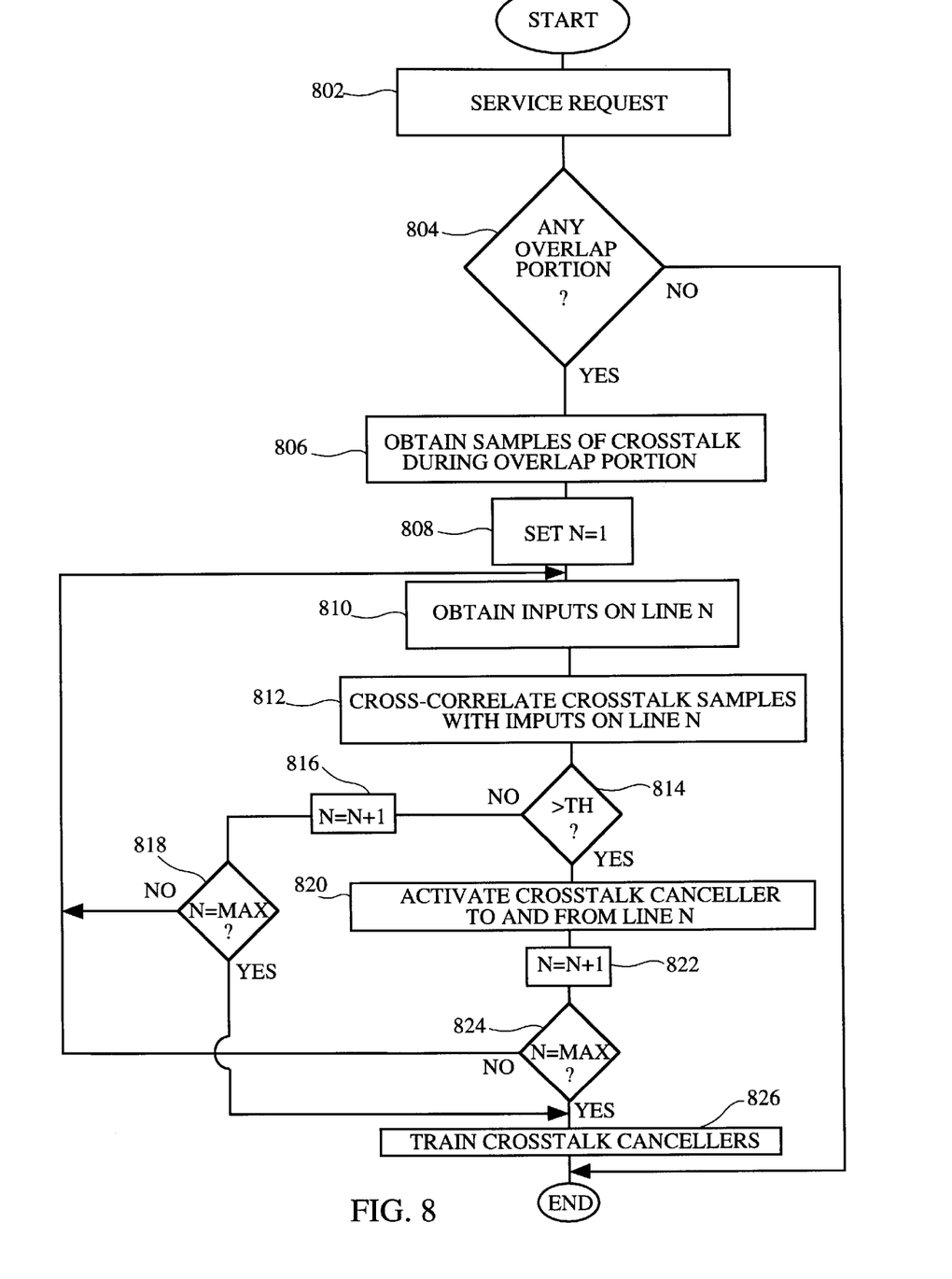
FIG. 8 is a flow diagram of crosstalk canceller processing.

Along the lines of the second approach for identifying the crosstalking lines, FIG. 8 is a flow diagram of crosstalk canceller processing 800. The crosstalk canceller processing 800 begins with a request 802 for service. Here, a line seeking to be brought into service, requests 802 service. Next, a decision block 804 determines whether there is any overlap portion between the line requesting service and other lines. Information on the overlap portion can be stored in the inter-line crosstalk table 416 shown in FIG. 4. If there is no overlap portion, then the crosstalk canceller processing 800 is complete and ends. When there is no overlap portion, no crosstalk cancellers are needed because there are no overlapping regions of transmission and reception of data signals.

On the other hand, when the decision block 604 determines that there is an overlap portion amongst the frames, then the crosstalk canceller processing 800 continues. Samples of crosstalk are obtained 806 during the overlap portion. These samples are taken from the line that is to be brought into service. A variable N is then set to "1". The variable N represent a particular line that potentially induces crosstalk onto the line to be brought into service. Next, inputs on the line N are obtained 810. The inputs on the line N are then cross-correlated 812 with the samples of the crosstalk. Next, a decision block 814 compares the results of the cross-correlation 812 to a threshold amount. If the results of the cross-correlation 812 do not exceed the threshold amount, then the variable N is incremented (N=N+1). The variable N then refers to another of the lines that potentially induces crosstalk onto the line to be brought into service. Following block 816, a decision block 818 compares the variable N with a maximum amount. In previous embodiments discussed above, it was assumed that with a binder there would be at most six such lines, i.e., N=6. Hence, here the variable 6 would be compared to "6". When the variable N is not equal to the maximum amount, the crosstalk canceller processing 800 returns to repeat blocks 810 and subsequent blocks.

On the other hand, when the results of the cross-correlation 812 do exceed the threshold amount, then a crosstalk canceller is activated 820 between the line being brought into service and the line associated with the variable N. The variable N is then incremented (N=N+1). Next, a decision block 824 compares the variable N with a maximum amount (e.g., "6"). When the variable N is not equal to the maximum amount, the crosstalk canceller processing 800 returns to repeat blocks 810 and subsequent blocks. Alternatively, when the variable N is equal to the maximum amount, the crosstalk cancellers that have been activated are trained 826. Likewise, the crosstalk cancellers are trained 826 following the decision block 818 when the variable N is equal to the maximum amount. In either case, all the lines that that potentially induces crosstalk onto the line to be brought into service have been considered. The training of the crosstalk cancellers can be performed in many different ways.

One technique for training 826 the crosstalk cancellers that remove crosstalk induced by the line being brought into service is to initially transmit on the line coming into service at a low power level so that the crosstalk cancellers can have time to train and adapt without the transmission from the line coming into service severely distorting the signals on these other lines. Thereafter, the transmit power can be increased to normal levels. The training for the crosstalk canceller for crosstalk induced onto the line being brought into service can be trained in a similar manner or can be trained while the other lines are transmitting and while the line being brought into service is not transmitting (e.g., quiet period or before beginning service).

Although the embodiment discussed above pertain primarily to a centralized data transmission system, the techniques described herein for crosstalk cancellation are also useable at remote sites. However, at remote sites, when the transmitters are not colocated, the crosstalk problem decreases. Practically speaking, with SDMT, a mixed level of service is not very common and the remote sites tend not to be co-located. Hence, the worst case is probably one line causing crosstalk interference on the line of the remote site. Here, the above-described techniques for crosstalk cancellation can be used at the remote site (e.g., remote modem unit). Another approach is to use a radio frequency noise canceller such as described in U.S. application Ser. No. 60/016,251 entitled RADIO FREQUENCY NOISE CANCELLER, and which was incorporated by reference above.

One advantage of the invention is that processing needed to implement the NEXT cancellers is substantially reduced.

Another advantage of the invention is that the noise cancellation processing is efficient because the processing is avoided when it would be unnecessary. The invention is particularly suited for high speed data transmission where crosstalk interference (NEXT interference) produced by other transmitting lines within the same binder can significantly degrade the desired data signals being transmitted.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A crosstalk interference canceller as recited in claim wherein the first line and the second line are twisted-pair wires.

2. A crosstalk interference canceller for mitigating crosstalk interference induced by signals on a first line onto signals on a second line, said crosstalk interference canceller comprising:

an adaptive filter for producing a crosstalk cancellation signal based on estimated coupling coefficients between the first line and the second line at predetermined frequencies and based on signals on the first line at the predetermined frequencies: and a subtractor for subtracting the crosstalk cancellation signal from the signals on the second line to produce a modified signal on the second line, the modified signal thereby having any crosstalk interference from the first line mitigated, wherein said crosstalk interference canceller forms part of a synchronized DMT system, and wherein the predetermined frequencies are tone frequencies used by the synchronized DMT system.

3. A crosstalk interference canceller for mitigating crosstalk interference induced by signals on a first line onto signals on a second line, said crosstalk interference canceller comprising:

an estimator to estimate crosstalk coupling coefficients for the first line with respect to the second line at predetermined frequencies;

a comparator to compare the estimated coupling crosstalk coefficients with a predetermined threshold; and a processor to process a signal being received on the second line to mitigate the crosstalk interference induced on the signal from the first line based on the estimated crosstalk coupling coefficients determined to be greater than the predetermined threshold.

4. A crosstalk interference canceller as recited in claim 3, wherein said processor comprises:

a multiplier to multiply the signal on the first line by the estimated crosstalk coupling coefficients to produce an estimated crosstalk signal; and a subtractor for subtracting the estimated crosstalk signal from the signal on the second line to produce a modified signal on the second line.

5. A crosstalk interference canceller as recited in claim 3, wherein said crosstalk interference canceller forms part of a synchronized DMT system, and wherein the predetermined frequencies are tone frequencies used by the synchronized DMT system.

6. In a synchronized DMT system using time division multiplexed data transmission in which the direction of data transmission for all channels switches direction periodically, and between each direction change there is a quiet period in which no data is transmitted in either direction, the synchronized DMT system also operating over a number of lines at a transmission site, a crosstalk interference canceller comprising:

means for identifying respective pairs of lines that have overlap portions in which the direction data is concurrently transmitted in opposite directions;

means for determining crosstalk interference coefficients for the identified pairs of lines;

means for comparing the crosstalk interference coefficients with a predetermined threshold;

means for eliminating further operations for the identified pairs of lines in which the crosstalk interference coefficients do not exceed the predetermined threshold; and means for canceling crosstalk from the remaining identified pairs of lines using the crosstalk interference coefficients.

7. A method for canceling near-end crosstalk (NEXT) interference induced on a received signal by a transmitting signal, said method comprising:

transmitting a first signal on a first line while simultaneously receiving a second signal on a second line;

estimating a crosstalk coefficient for the first line with respect to the second line;

comparing the crosstalk coefficient with a predetermined threshold; and processing the second signal being received to mitigate the NEXT interference induced on the second signal from the first signal when the estimated crosstalk coefficient is determined to be greater than the predetermined threshold.

8. A method as recited in claim 7, wherein said processing comprises:

multiplying the first signal by the estimated crosstalk coefficient to produce an estimated NEXT interference; and reducing the second signal by the estimated NEXT interference.

9. A method as recited in claim 8, wherein said processing further comprises:

adaptively updating the estimated crosstalk coefficient.

10. A method as recited in claim 8, wherein said processing further comprises:

adaptively updating the estimated crosstalk coefficient using a Least-Means-Square (LMS) approach.

11. A method as recited in claim 7, wherein said first and second signals include DMT symbols having a plurality of fixed frequency tones, and wherein said estimating of the crosstalk coefficient for the first signal with respect to the second signal produces an estimated crosstalk coefficient for each of the tones of the DMT symbols.

12. A method as recited in claim 11, wherein said processing comprises:

producing an estimated NEXT interference for each of the tones of the DMT symbols; and reducing the respective tones of the DMT symbols of the second signal by the estimated NEXT interference for the respective tones.

13. A method as recited in claim 12, wherein said producing the estimated NEXT interference for each of the tones multiplies respective tones of the first signal by the estimated crosstalk coefficient for the respective tones.

14. In a synchronized DMT system using time division multiplexed data transmission in which the direction of data transmission for all channels switches direction periodically, and between each direction change there is a quiet period in which no data is transmitted in either direction, the synchronized DMT system also operating over a number of lines at a transmission site, a method for canceling near-end crosstalk (NEXT) interference, said method comprising:

transmitting a first signal on a first line while simultaneously receiving a second signal on a second line, the first and second signals include DMT symbols having a plurality of fixed frequency tones;

producing an estimated crosstalk coefficient for each of the tones of the DMT symbols for the first line with respect to the second line; and     processing a plurality of the tones of the second signal being received to mitigate the NEXT interference induced on the second signal from the first signal based on the estimated crosstalk coefficients for the respective tones.

15. A method as recited in claim 14, wherein said processing comprises:

producing an estimated NEXT interference for each of the tones of the DMT symbols; and     reducing the respective tones of the DMT symbols of the second signal by the estimated NEXT interference for the respective tones.

16. A method as recited in claim 14, wherein said processing is avoided for those of the tones in which the estimated crosstalk coefficient is less than a threshold amount.

17. A method as recited in claim 14, wherein said processing further comprises:

adaptively updating the estimated crosstalk coefficients using an adaptive approach.

18. A method as recited in claim 14, wherein said transmitting on the first line is in accordance with a first transmission frame, and said receiving on the second line is in accordance with a second transmission frame, and     wherein said processing is performed only during an overlap portion in which the first transmission frame transmits data for the first signal and the second transmission frame receives data for the second signal.

19. A crosstalk interference canceller as recited in claim 2, wherein the first line and the second line are twisted-pair wires bundled in a binder, and the crosstalk interference being mitigated is induced internal to the binder.

* * * * *